July 17, 1934.    M. STANSBURY    1,966,770
MOUNTING SUPPORT FOR AUTOMOBILE WHEELS
Filed Oct. 12, 1931
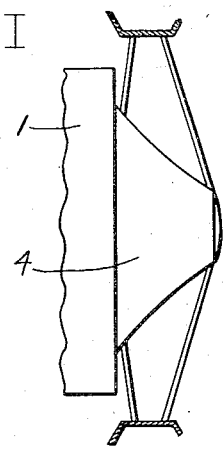
Fig. I
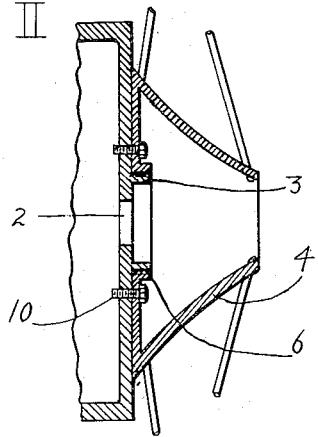
Fig. II
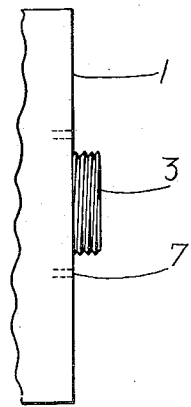
Fig. III
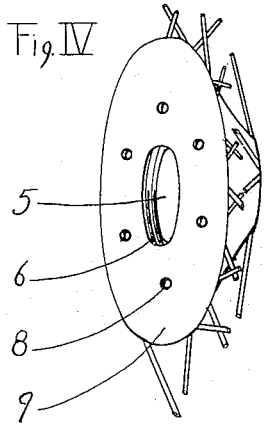
Fig. IV
INVENTOR
Miller Stansbury Patented July 17, 1934

1,966,770

UNITED STATES PATENT OFFICE 1,966,770

MOUNTING SUPPORT FOR AUTOMOBILE WHEELS

Miller Stansbury, Washington, D. C.

Application October 12, 1931, Serial No. 568,404

1 Claim. (Cl. 301—6)

This invention relates to improvements in automobile wheels and has especial reference to a screw threaded mounting support for the wheel.

The object of this invention is to provide the brake drum with an externally screw threaded support projecting therefrom and to provide the wheel hub with an inwardly extending lip or flange internally screw threaded, these parts being so designed that when mounting the wheel it is simply screwed on the support and when the web of the hub faces firmly against the face of the drum the holes in each member for the retaining bolts will be in alignment. This method of wheel mounting not only reduces the time required for a wheel change but virtually eliminates the physical effort now required to maintain the wheel in proper relation to the drum while fastening it thereto.

A further and more important object is that by permitting a firm and mechanically accurate relation of wheel to drum before insertion of the retaining bolts, said bolts may then be easily inserted and tightened without the danger of warping the wheel with its resultant injurious effects upon the entire front end assembly of the vehicle.

The invention consists of the novel construction, arrangements, and combination of parts hereinafter more fully set forth in the following specifications and pointed out in detail in the appended claim.

Figure I is a side elevation of a wheel partly broken away and secured to the brake drum.

Figure II is a similar view of Figure I with the wheel hub and brake drum in section.

Figure III is a side elevation of the brake drum showing the screw threaded wheel support.

Figure IV is a perspective view of the wheel hub designed to fit upon the support shown in Figure III.

Referring to the accompanying drawing, forming part of this specification, and in which like reference numerals designate like parts throughout the several views thereof, 1 designates a brake drum having the usual central opening 2, and spaced at a distance from said opening is the externally screw threaded shoulder 3 which forms the support for the wheel when the latter is being mounted. The wheel hub 4 has the usual opening 5 provided with an annular flange 6 which is internally screw threaded. The threads of the mating shoulder 3 and flange 6 are cut so that the bolt holes 7 in the drum, surrounding the shoulder 3, and the bolt holes 8 of the wheel hub, surrounding the flange 6, will come into alignment when the web 9 of the wheel hub bears firmly throughout its circumference against the face of the drum 1 permitting the insertion of the bolts 10.

It will thus be seen that in mounting the wheel it is not even necessary to lift the wheel as the brake drum 1 may be jacked to a sufficient height so that the shoulder 3 may be screwed into the threaded flange of the wheel by simply turning the drum by hand. When the web 9 of the hub is drawn up flush against the drum and the respective bolt holes 7 and 8 line up as related above, the bolts 10 may be inserted by feel, that is to say without visual aid, and may be tightened without danger of warping or buckling the wheel. It is readily appreciated that wheel changing even at night is materially simplified.

Having thus described my invention what I claim is:—

The combination with a brake drum having a central opening to receive an axle, an annular shoulder surrounding said opening and spaced at a distance therefrom and projecting from one face of said drum and at right angles thereto, said shoulder being screw threaded on its outer surface, a circuit series of bolt holes surrounding said shoulder; of a wheel having a circular series of bolt holes in the web forming the hub, a central opening in said web surrounded by said bolt holes, the inner surface of said opening screw threaded and adapted to be screwed upon the threaded surface of the said shoulder to hold the wheel hub tightly against the face of the drum throughout its entire circumference to prevent buckling while being secured in position and at the same time to align the bolt holes of the wheel hub and brake drum, and means for securing the wheel to the brake drum.

MILLER STANSBURY.